Oct. 21, 1941. C. M. WILSON ET AL 2,259,504

COMBINED MEASURING AND LEVELING SPOON

Filed Oct. 3, 1939

INVENTORS:—
CLARENCE M. WILSON AND
JOHN THORNE LANE.
BY Martin P. Smith ATTY.

Patented Oct. 21, 1941

2,259,504

UNITED STATES PATENT OFFICE 2,259,504

COMBINED MEASURING AND LEVELING SPOON

Clarence M. Wilson, New York, N. Y., and John Thorne Lane, Los Angeles, Calif.

Application October 3, 1939, Serial No. 297,636

7 Claims. (Cl. 73—165)

Our invention relates to a combined measuring and leveling spoon and has for its principal object, the provision of a relatively simple, practical and inexpensive utensil that may be used for the convenient and accurate measuring of pre-determined amounts of pulverized or powdered products, for instance, baking powder, soda, cream of tartar, and other ingredients used in culinary operations, also for the accurate measuring of pulverized chemicals and the like in the compounding of pharmaceutical preparations.

A further object of our invention is, to provide a measuring device comprising an arm or handle with receptacles of different capacities at both ends of said handle, with a member pivotally mounted on the intermediate portion of the handle so that it may be moved across the upper edges of the bowls or containers to level the pulverized material therein, thus insuring accuracy in obtaining pre-determined amounts of various pulverized or powdered products or materials.

A further object of our invention is, to provide one of the bowls or receptacles at the end of the handle with partitions, thus dividing the chamber within said receptacle into a plurality of compartments of uniform size, thus enabling the accurate measuring of fractional portions of a pre-determined amount of material, for instance, a quarter, a half, or three-quarters of a teaspoonful or a tablespoonful.

With the foregoing and other objects in view, our invention consists in certain novel features of construction and arrangement of parts that will be hereinafter more fully described and claimed and illustrated in the accompanying drawing in which:

Figure 1:
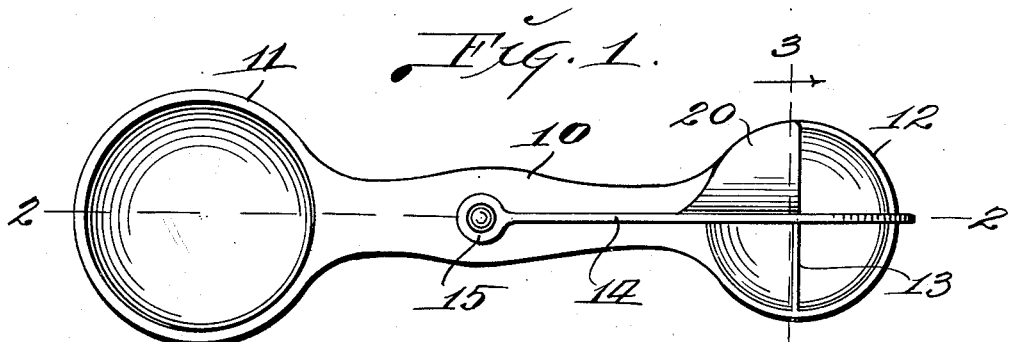
Fig. 1 is a top plan view of a combined measuring and leveling spoon constructed in accordance with our invention.
Figure 2:
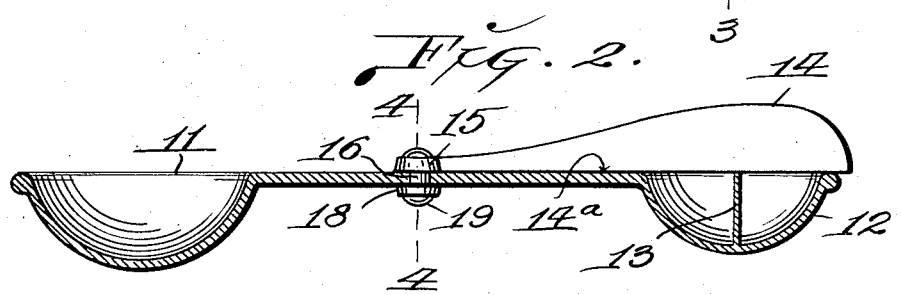
Fig. 2 is a longitudinal section taken on the line 2—2 of Fig. 1.
Figure 3:
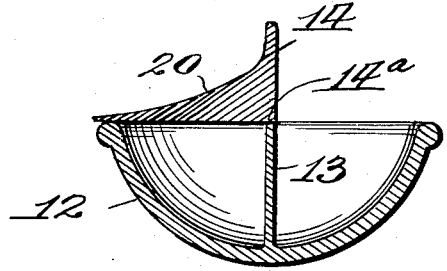
Fig. 3 is an enlarged cross section taken on the line 3—3 of Fig. 1.
Figure 4:
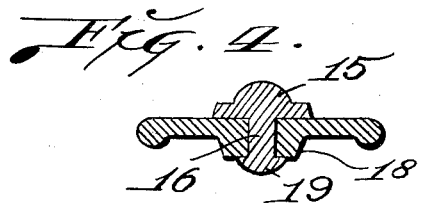
Fig. 4 is an enlarged cross section taken on the line 4—4 of Fig. 2.

Referring by numerals to the accompanying drawing which illustrates a preferred embodiment of our invention, 10 designates a shank that serves as a handle or arm and formed integral with the ends thereof are receptacles 11 and 12, preferably bowl-shape, and where the device is to be used in a kitchen one of these bowl may have the capacity of a standard or conventional tablespoon while the other bowl has the capacity of a conventional teaspoon.

Formed integral with the smaller one of the bowls 12 that has the capacity of a teaspoon are thin partitions 13 disposed at right angles to each other, thereby dividing the space within the bowl into four compartments of equal size and each having the capacity of a quarter of a teaspoon.

The means utilized for leveling the surfaces of the pulverized or powdered products in the bowls 11 and 12 comprises an arm 14 of thin material with a straight lower edge 14a that is adapted to sweep across the upper edges of the bowls 11 and 12 and the inner end of this arm 14 is provided with an integral head 15 from which depends an integral stud 16.

This stud 16 passes through and is arranged for rotation in an aperture 17 that is formed through the center of the handle and through an integral lug 18 that is formed on the under side of the central portion of handle 10. After the stud 16 has been inserted through the aperture 17, its projecting lower end is heated and pressed downwardly in order to form a head 19 on the under side of lug 18 and thus, the arm 14 is mounted for swinging movement on the handle 10.

The construction just described simplifies manufacture of the spoon and the assembly of the parts thereof, due to the fact that no separately formed rivet is utilized and likewise no separately formed washer beneath the head of the stud is required.

The handle 10, bowls 11 and 12, together with the pivoted or swinging arm 14, its head 15 and stud 16, are preferably formed of suitable plastic material, resinous substances, Celluloid or the like, or said parts may be formed of light weight metal, such as aluminum.

Formed integral with and projecting outwardly from the lower edge of the pivoted arm 14 is a thin, horizontally disposed plate 20 of such size and shape as to cover one of the compartments of the bowl 12 and which plate together with the pivoted arm and the partitions 13 in bowl 12 provide means for accurately measuring one quarter, a half, or three-quarters of a teaspoonful of material or product.

The outer edge of the plate 20 is very thin and said plate is constructed so that its upper surface curves or inclines gradually from the sharp outer edge upwardly toward the upper edge of the arm 14 and as a result of this construction, the leveling of the pulverized or powdered product in the bowls is facilitated and the curving or inclining of the upper surface of the plate 20 enables the pulverized product to readily flow therefrom during the leveling operation.

In the use of our improved measuring and leveling device, one of the bowls on the end of the handle 10 is dipped into the container of powdered or pulverized product and to level off the body of the product contained in said bowl, the arm 14 is swung upon its axis, the stud 16, so that said arm sweeps across the top of the bowl, thereby removing the excess material or product and retaining in the bowl the desired amount of product, for instance, a tablespoonful or a teaspoonful, depending on which bowl has been filled and leveled.

In the event that a quarter of a teaspoonful of material is desired, the bowl 12 is dipped into the container of the product or material and after the arm 14 has been swept across the upper edge of said bowl to level the material or product therein, said arm is returned to a central lengthwise position upon the handle 10 so that plate 20 covers one of the four compartments in said bowl.

The device is now turned or partially inverted so that the material in the three uncovered compartments discharges therefrom, thus leaving in the covered compartment a quarter teaspoonful of product.

To obtain a half teaspoonful of product, the operation incident to the measuring of a quarter teaspoonful is repeated, thus obtaining two quarters teaspoonful which equal a half teaspoonful of the material.

To obtain three-quarters of a teaspoonful of product, bowl 12 is filled with product and the product levelled by manipulation of the arm 14 after which the arm is brought to a central longitudinal position so as to cover one of the compartments in the bowl and the material in the three uncovered compartments may now be discharged to provide the desired three-quarters of a teaspoonful of the product or material.

Thus it will be seen that we have provided a combined measuring and leveling spoon that is relatively simple in construction, inexpensive of manufacture and very effective in performing the functions for which it is intended.

It will be understood that minor changes in the size, form and construction of the various parts of our improved combined measuring and leveling spoon, may be made and substituted for those herein shown and described, without departing from the spirit of our invention, the scope of which is set forth in the appended claims.

We claim as our invention:

1. A measuring and leveling spoon comprising a handle, bowls of different sizes on the ends thereof, partitions within one of said bowls for dividing the space therein into four compartments of equal size, an arm pivotally mounted on the intermediate portion of said handle and adapted to sweep across the tops of said bowls and a plate projecting from one side of said arm and adapted to cover one of the compartments of the bowl having the partitions.

2. In a measuring and leveling spoon, a handle, a bowl on the end of said handle, partitions dividing the space within said bowl into compartments of equal size, an arm pivoted to the handle and adapted to sweep across the upper edge of the bowl and means carried by said arm and adapted to close one of the compartments in said bowl.

3. In a measuring and leveling spoon, a handle, a bowl on the end of said handle, partitions dividing the space within said bowl into compartments of equal size, an arm pivoted to the handle and adapted to sweep across the upper edge of the bowl and a plate integral with and projecting laterally outward from one side of said pivoted arm for closing one of the compartments in said bowl.

4. A combined measuring and leveling spoon comprising a handle, bowls of different sizes on the ends thereof, one of said bowls having a plurality of compartments and means mounted on said handle for leveling the upper surfaces of the contents of said bowls and for covering one of the compartments in the divided bowl.

5. A measuring and leveling spoon comprising a handle, bowls of different sizes on the ends of said handle, a lug formed integral with the under side of said handle, there being an aperture formed through said lug and handle, a leveling arm adapted to sweep across the tops of the bowls to level the surfaces of the material or product contained therein, a disc formed integral with and depending from the inner end of said arm, the under face of which disc lies flat on top of the central portion of said handle, a stud formed integral with and depending from the center of said disc, which stud passes through the aperture in said lug and handle and a head formed on the lower end of said stud.

6. A measuring and leveling spoon comprising a handle, bowls of different sizes on the ends of said handle, one of which bowls has a plurality of compartments, an arm pivotally mounted on said handle and adapted to sweep across the tops of said bowls and a laterally disposed plate projecting outwardly from one side of said arm for covering one of said compartments, the outer edge of which plate is thin.

7. A measuring and leveling spoon comprising a handle, bowls of different sizes on the ends of said handle, one of which bowls has a plurality of compartments, an arm pivotally mounted on said handle and adapted to sweep across the tops of said bowls, a laterally disposed plate projecting outwardly from one side of said arm for covering one of said compartments, the outer edge of which plate is thin and the upper surface of which plate gradually declines from the upper edge of said arm to the thin outer edge of said plate.

CLARENCE M. WILSON.
JOHN THORNE LANE.